United States Patent
Fan

(10) Patent No.: US 8,471,151 B2
(45) Date of Patent: Jun. 25, 2013

(54) LAYOUT METHOD FOR BRIDGING ELECTRODE CAPABLE OF SHIELDING BRIGHT SPOT AND STRUCTURE OF THE BRIDGING ELECTRODE

(76) Inventor: Li-Li Fan, Taoyuan County (TW)

( * ) Notice: Subject to any disclaimer, the term of this patent is extended or adjusted under 35 U.S.C. 154(b) by 417 days.

(21) Appl. No.: 12/926,347

(22) Filed: Nov. 12, 2010

(65) Prior Publication Data

US 2012/0118613 A1 May 17, 2012

(51) Int. Cl.
*H05K 1/03* (2006.01)
*H05K 3/02* (2006.01)
*G06F 3/041* (2006.01)

(52) U.S. Cl.
USPC .............. 174/255; 174/254; 345/173; 29/846

(58) Field of Classification Search
USPC .............. 174/254–261; 29/846–853; 345/173
See application file for complete search history.

(56) References Cited

U.S. PATENT DOCUMENTS

| 2010/0207891 A1* | 8/2010 | Wang | 345/173 |
| 2012/0105342 A1* | 5/2012 | Yu | 345/173 |
| 2012/0247937 A1* | 10/2012 | Saito et al. | 200/512 |

* cited by examiner

*Primary Examiner* — Jeremy Norris
(74) *Attorney, Agent, or Firm* — C. G. Mersereau; Nikolai & Mersereau, P.A.

(57) ABSTRACT

A layout method for a bridging electrode capable of shielding a bright spot includes the steps of: providing a substrate; forming a transparent electroconductive layer, having neighboring pattern blocks, on the substrate; forming an alignment film layer, having bridging grooves for crossing between the pattern blocks, over the substrate; forming an electroconductive layer, having wires respectively correspondingly disposed over the bridging grooves, over the substrate; forming an electroconductive correspondence layer on one side of the electroconductive layer to shield the wires; and forming a protection layer over the substrate to enhance optical transmission and protect the substrate, the transparent electroconductive layer, the alignment film layer and the electroconductive layer. Meanwhile, the invention also provides a structure of the bridging electrode capable of shielding the bright spot and corresponding to the layout method.

16 Claims, 9 Drawing Sheets

Applying a colored photoresist onto a wire pattern through screen printing or a mask having the wire pattern to form an electroconductive correspondence layer pattern shielding the wire pattern. ⎯ S5"-1

FIG.7

Applying/ sputtering a fifth photoresist or an organic material over the substrate; and ⎯ S6-1

Baking the fifth photoresist or the organic material to forming a hard protection film. ⎯ S6-2

FIG.8

LAYOUT METHOD FOR BRIDGING ELECTRODE CAPABLE OF SHIELDING BRIGHT SPOT AND STRUCTURE OF THE BRIDGING ELECTRODE

BACKGROUND OF THE INVENTION (1) Field of the Invention

The invention relates to a layout method for a bridging electrode capable of shielding a bright spot and a structure of the bridging electrode, and more particularly to a layout method for a bridging electrode using an electroconductive correspondence layer disposed on one side of an electroconductive layer to shield a bright spot generated by the electroconductive layer, and a structure of the bridging electrode.

(2) Description of the Prior Art

In the conventional processes of manufacturing a capacitive touch panel, electrodes with two different axial directions are formed on a substrate, an insulating layer is formed on the electrodes in one of the axial directions, and the electrodes in the other one of the axial directions are electrically connected through metal wires on the insulating layer. However, the metal wires on the insulating layer may be damaged in the subsequent manufacturing process, so that the electrical connections cannot be made, and the production yield of the capacitive touch panel is decreased.

In some prior arts, the metal wires may be disposed in bridging grooves according to the technology for the bridging grooves to prevent the metal wires from being damaged. However, after the metal wires are free from being damaged, the metal wires may induce a plurality of bright spots on the touch panel after the capacitive touch panel is assembled, as shown in FIG. 1. Thus, the display trouble is caused.

Therefore, it is necessary to provide a novel structure to effectively enhance the yield of the capacitive touch panel and further to prevent the bright spots from being generated.

SUMMARY OF THE INVENTION

It is therefore an object of the invention to provide a layout method for a bridging electrode capable of shielding a bright spot, wherein an electroconductive correspondence layer is utilized to shield the electroconductive layer and achieve the object that no bright spot is generated.

Another object of the invention is to provide a structure of a bridging electrode capable of shielding a bright spot, wherein an electroconductive correspondence layer is disposed on one side of the electroconductive layer to shield the bright spot generated in the electroconductive layer.

To achieve the above-identified or other objects, the invention provides a layout method for a bridging electrode capable of shielding a bright spot. The method includes the steps of: providing a substrate; forming a transparent electroconductive layer over the substrate, wherein the transparent electroconductive layer has a plurality of neighboring pattern blocks; forming an alignment film layer over the substrate, wherein the alignment film layer has a plurality of bridging grooves crossing between the pattern blocks; forming an electroconductive layer over the substrate, wherein the electroconductive layer has a plurality of wires respectively correspondingly disposed over the bridging grooves; forming an electroconductive correspondence layer on one side of the electroconductive layer to shield the wires; and forming a protection layer over the substrate to increase a ratio of optical transmission and protect the substrate, the transparent electroconductive layer, the alignment film layer and the electroconductive layer.

To achieve the above-identified or other objects, the invention also provides a structure of a bridging electrode capable of shielding a bright spot and being used in a capacitive touch panel. The structure includes a substrate, a plurality of first electrode blocks, a plurality of second electrode blocks, a bridging insulation unit and a plurality of electrode correspondence blocks. The first electrode blocks are disposed on the substrate and electrically connected together in series through a first wire. The second electrode blocks are disposed on the substrate and on two sides of the first wire. The bridging insulation unit is vertically disposed on the first wire and has a bridging groove. A height of the bridging groove is lower than a height of the bridging insulation unit. The electrode correspondence blocks shield the first electrode blocks and/or the second electrode blocks. The second electrode blocks are electrically connected together in series through the bridging insulation unit having a second wire.

To achieve the above-identified or other objects, the invention also provides a structure of a bridging electrode capable of shielding a bright spot. The structure includes a substrate layer, a transparent electroconductive layer, an alignment film layer, an electroconductive layer and an electroconductive correspondence layer. The transparent electroconductive layer is disposed on at least one side of the substrate layer. The alignment film layer is disposed on one side of the substrate layer. The electroconductive layer is adjacently disposed on one side of the alignment film layer. The electroconductive correspondence layer is disposed on one side of the electroconductive layer to shield the electroconductive layer. In addition, the structure of the bridging electrode further includes a protection layer disposed on at least one side of the electroconductive correspondence layer.

Compared with the prior art, the layout method for the bridging electrode capable of shielding the bright spot and the structure of the bridging electrode can effectively enhance the process yield, and can further prevent the bright spot from being formed on the capacitive touch panel according to the electroconductive correspondence layer shielding the electroconductive layer. In one embodiment, the object of shielding the bright spot in the capacitive touch panel may also be achieved without stripping the photoresist of the electroconductive layer.

Further aspects, objects, and desirable features of the invention will be better understood from the detailed description and drawings that follow in which various embodiments of the disclosed invention are illustrated by way of examples.

BRIEF DESCRIPTION OF THE DRAWINGS

FIGS. 2 to 8 are schematic flow charts showing a layout method for a bridging electrode capable of shielding a bright spot.

DETAILED DESCRIPTION OF THE PREFERRED EMBODIMENTS

Further aspects, objects, and desirable features of the invention will be better understood from the detailed description and drawings that follow in which various embodiments of the disclosed invention are illustrated by way of examples.

Figure 1:
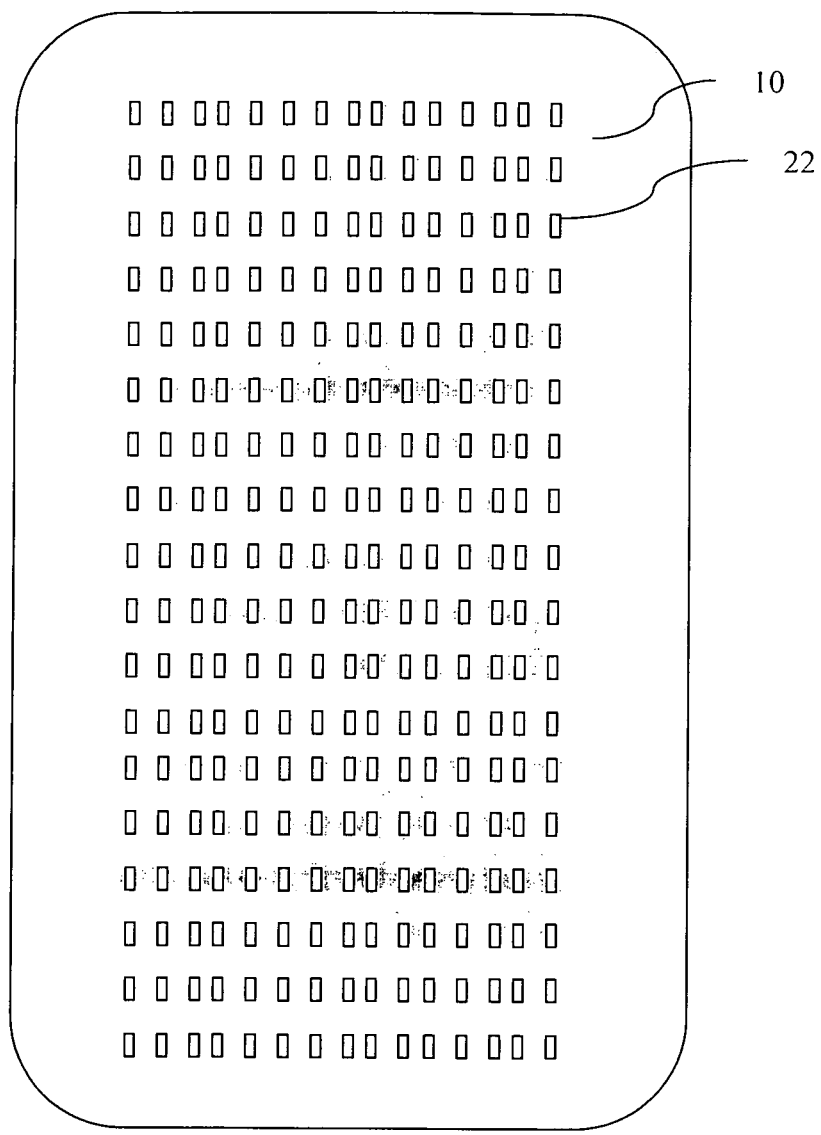
FIG. 1 is a schematic illustration showing a conventional capacitive touch panel.
Figure 2:
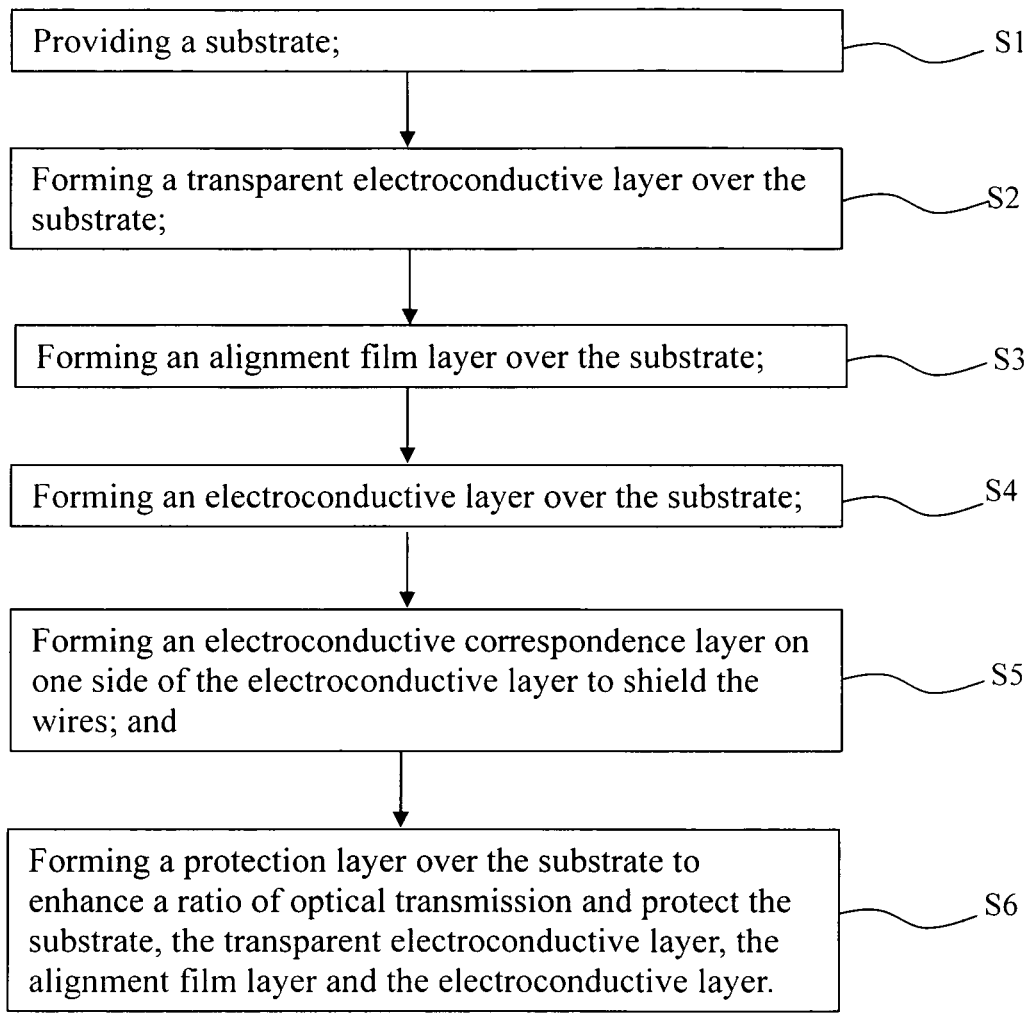

FIGS. 2 to 5 are schematic flow charts showing a layout method for a bridging electrode capable of shielding a bright spot. As shown in FIG. 2, the layout method for the bridging electrode starts from step S1 of providing a substrate. Next, in step S2, a transparent electroconductive layer is formed over the substrate. The transparent electroconductive layer has a plurality of neighboring pattern blocks. Then, in step S3, an alignment film layer is formed over the substrate, and the alignment film layer has a plurality of bridging grooves crossing between the pattern blocks. Next, in step S4, an electroconductive layer is formed over the substrate, and the electroconductive layer has a plurality of wires respectively correspondingly disposed over the bridging grooves. In another embodiment, the wires of the electroconductive layer are formed through an optically compensated mask in conjunction with at least one of over exposure and over development. Then, in step S5, an electroconductive correspondence layer is formed and disposed on one side of the electroconductive layer to shield the wires. Next, in step S6, a protection layer is formed over the substrate to enhance the ratio of optical transmission and protect the substrate, the transparent electroconductive layer, the alignment film layer and the electroconductive layer.

Figure 3:
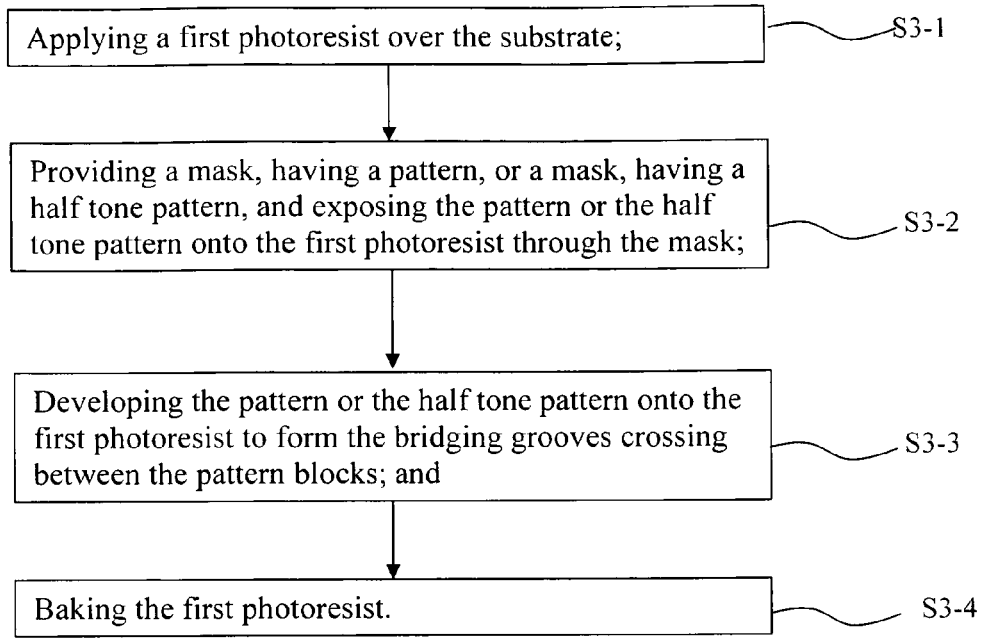

Furthermore, FIG. 3 shows the detailed sub-steps of the step S3, wherein the step of forming the alignment film layer includes: the sub-step S3-1 of applying a first photoresist over the substrate; the sub-step S3-2 of providing a mask having a pattern, or a mask having a half tone pattern, and exposing the pattern or the half tone pattern onto the first photoresist through the mask; the sub-step S3-3 of developing the pattern or the half tone pattern onto the first photoresist to form the bridging grooves crossing between the pattern blocks; and the sub-step S3-4 of baking the first photoresist.

It is to be noted that the step of forming the mask with the half tone pattern includes providing the line diameter in the opaque region of the surface of the mask to be greater than the line diameter of the half tone pattern or forming a plurality of voids (e.g., the voids may be circular, rectangular or arbitrarily shaped), and evenly disposing the voids on the surface of the mask. According to the interference and diffraction actions of the light rays on the half tone pattern during exposure, the height of the bridging groove formed by the first photoresist after development is lower than the height of the bridging insulation unit.

Figure 4:
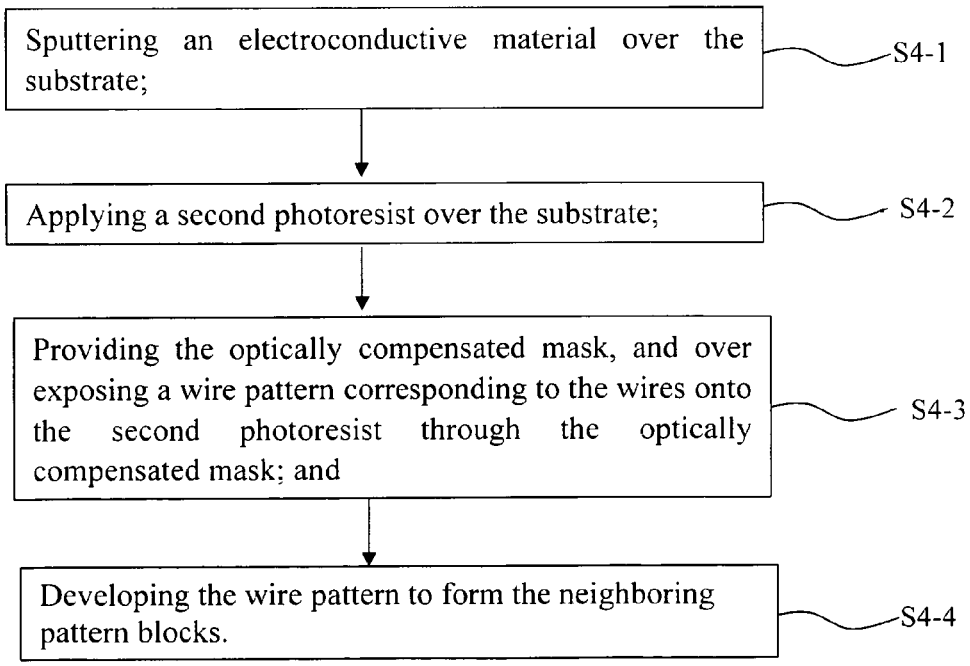

FIG. 4 shows the detailed sub-steps of the step S4, wherein the step of forming the electroconductive layer includes: the sub-step S4-1 of sputtering an electroconductive material over the substrate; the sub-step S4-2 of applying a second photoresist over the substrate; the sub-step S4-3 of providing the optically compensated mask and over exposing the wire pattern corresponding to the wires onto the second photoresist through the optically compensated mask; the sub-step S4-4 of developing the wire pattern to form the neighboring pattern blocks, wherein the wire pattern is formed by way of over exposure and over development.

Figure 5:
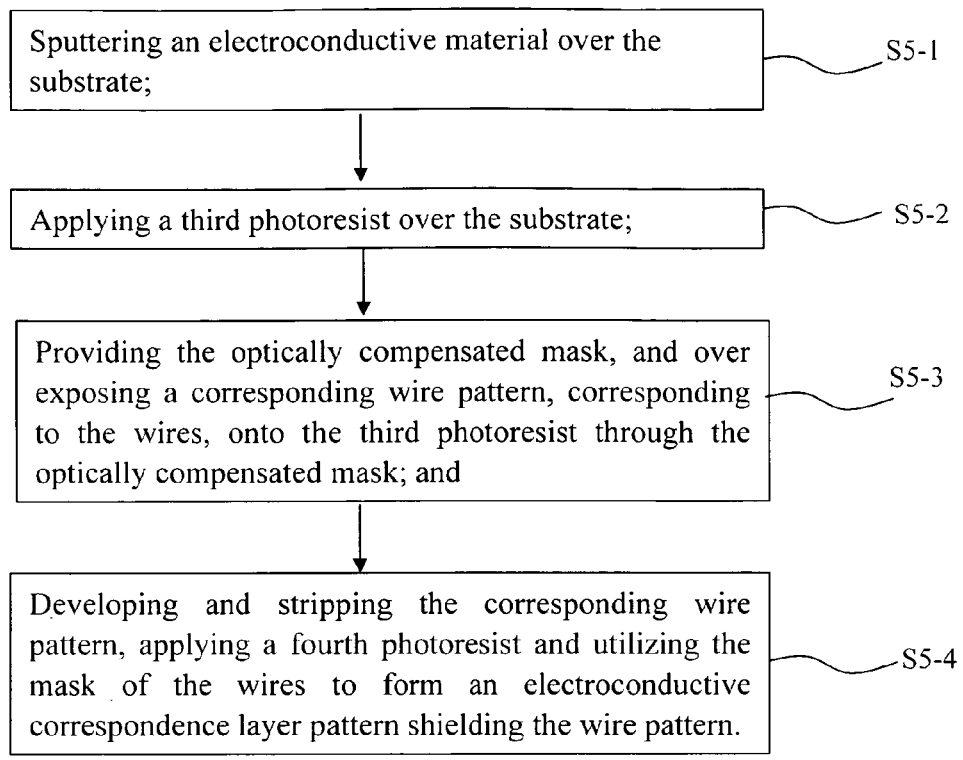

FIG. 5 shows the detailed sub-steps of the step S5, wherein the step of forming the electroconductive correspondence layer further includes the sub-step S5-1 of sputtering an electroconductive material over the substrate; the sub-step S5-2 of applying a third photoresist over the substrate; the sub-step S5-3 of providing the optically compensated mask and over exposing a corresponding wire pattern corresponding to the wires onto the third photoresist through the optically compensated mask; and the sub-step S5-4 of developing and stripping the corresponding wire pattern and then applying a fourth photoresist and utilizing the mask of the wires to form an electroconductive correspondence layer pattern shielding the wire pattern.

Figure 6:
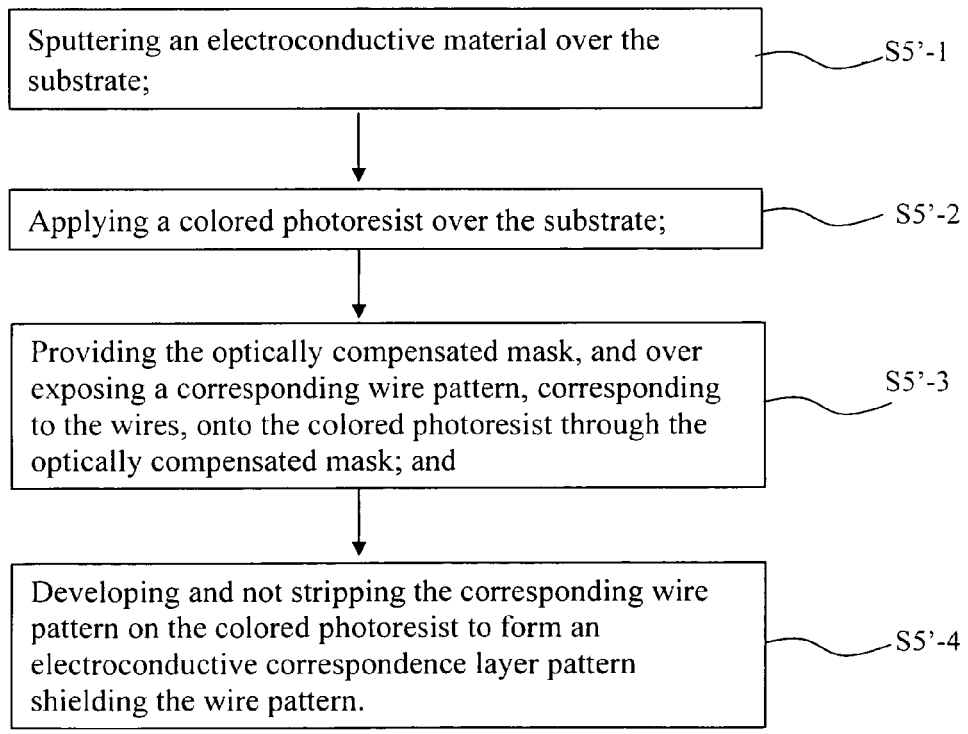
Figure 9A:
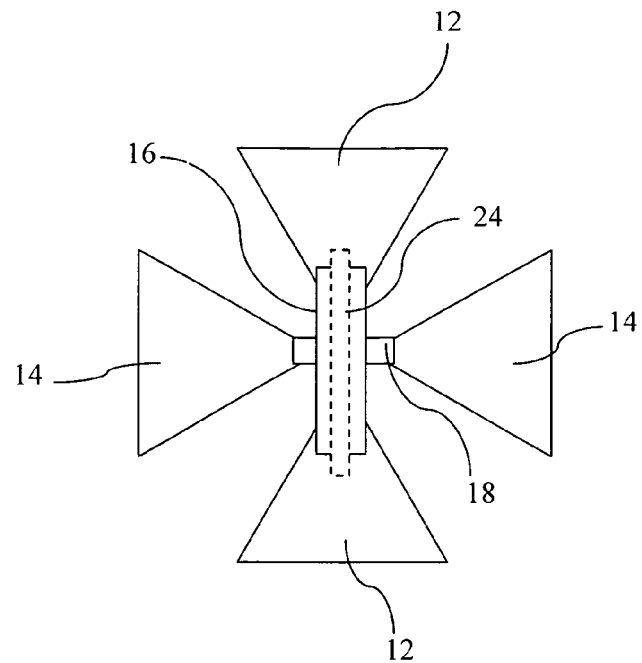
FIGS. 9a to 9d are schematic illustrations showing a structure of a bridging electrode capable of shielding a bright spot.
Figure 9B:
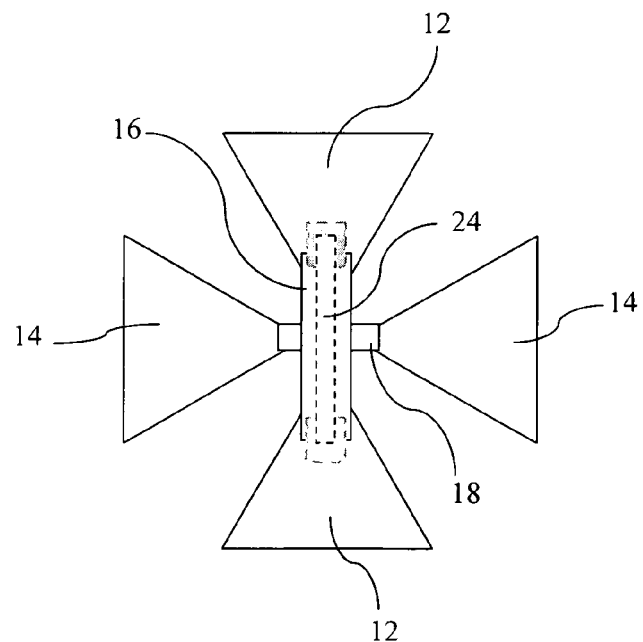
Figure 9C:
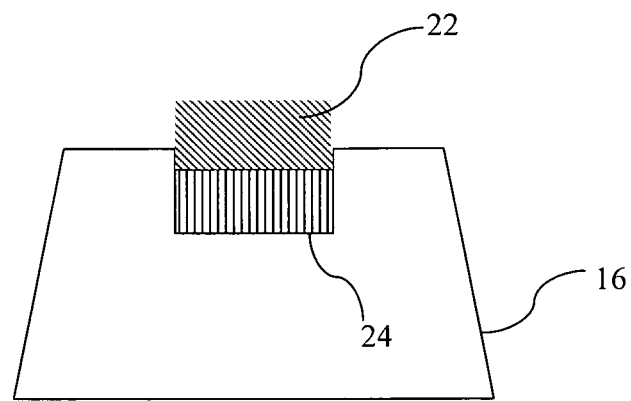
Figure 9D:
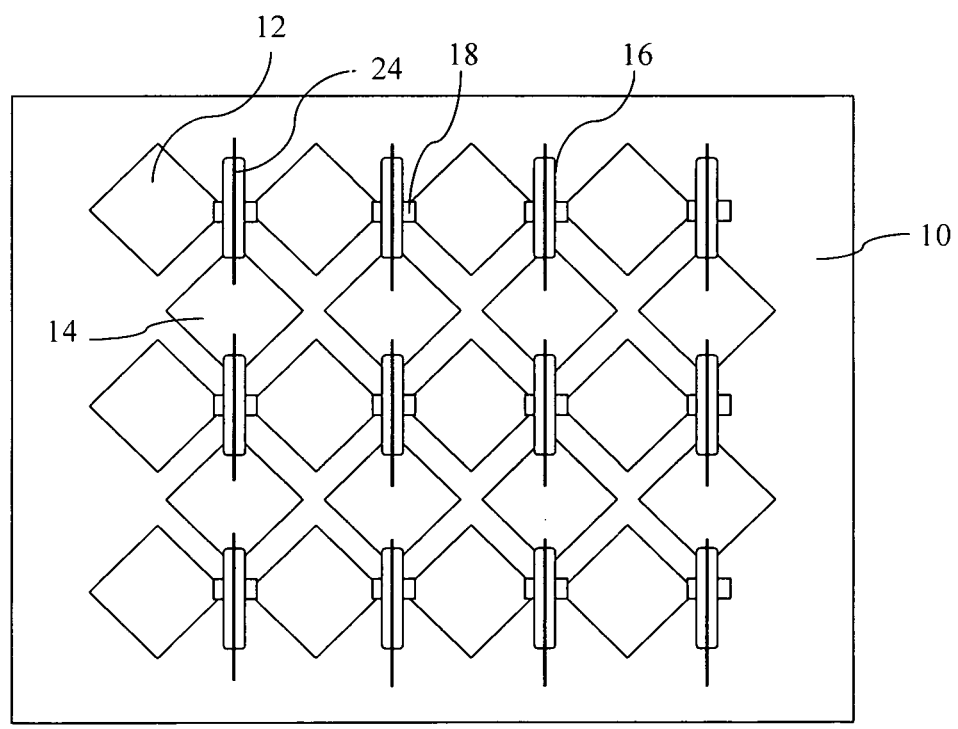

FIG. 6 shows the other detailed sub-steps of step S5, wherein the step of forming the electroconductive correspondence layer further includes the sub-step S5'-1 of sputtering an electroconductive material over the substrate; the sub-step S5'-2 of applying a colored photoresist over the substrate; the sub-step S5'-3 of providing the optically compensated mask, and over-exposing a corresponding wire pattern corresponding to the wires through the optically compensated mask onto the colored photoresist; and the sub-step S5'-4 of developing and not stripping the corresponding wire pattern on the colored photoresist to form an electroconductive correspondence layer pattern shielding the wire pattern.

FIG. 7 shows the other detailed sub-steps of the step S5, wherein the step of forming the electroconductive correspondence layer further includes: the sub-step S5"-1 of applying a colored photoresist onto a wire pattern through screen printing or a mask having the wire pattern (similar to the process of forming the electroconductive layer) to form an electroconductive correspondence layer pattern shielding the wire pattern.

FIG. 8 shows the detailed sub-steps of the step S6, wherein the step S6 further includes: the sub-step S6-1 of applying/sputtering a fifth photoresist or an organic material over the substrate; and the sub-step S6-2 of baking the fifth photoresist or the organic material to form a hard protection film.

FIGS. 9a to 9d are schematic illustrations showing a structure of a bridging electrode capable of shielding a bright spot. In this embodiment, the invention provides a structure of a bridging electrode being used in a capacitive touch panel. The structure includes a substrate 10, a plurality of first electrode blocks 12, a plurality of second electrode blocks 14 and bridging insulation units 16. The material of the substrate 10 may be a glass material so that a glass substrate is formed. The first electrode blocks 12 are disposed on the substrate 10 and are electrically connected together in series through first wires 18. The second electrode blocks 14 are disposed on the substrate 10 and respectively disposed on two sides of the first wire 18. Second wires 24 are disposed on the second electrode blocks 14. The bridging insulation units 16 are vertically disposed on the first wires 18, and have bridging grooves 20, wherein the height of the bridging groove 20 is lower than the height of the bridging insulation unit 16. It is to be noted that, in FIG. 9c, a plurality of electrode correspondence blocks 22 shields the first wires 18 on the first electrode blocks 12 and/or the second wires 24 on the second electrode blocks 14. The electrode correspondence blocks 22 corresponding to the electrode blocks 12 and 14 may overlap with the first electrode blocks 12. Alternatively, the electrode correspondence blocks 22 can completely cover and correspond to the first electrode blocks 12 and the second electrode blocks 14. For example, the electrode correspondence blocks 22 are made of the colored photoresist.

Figure 10A:
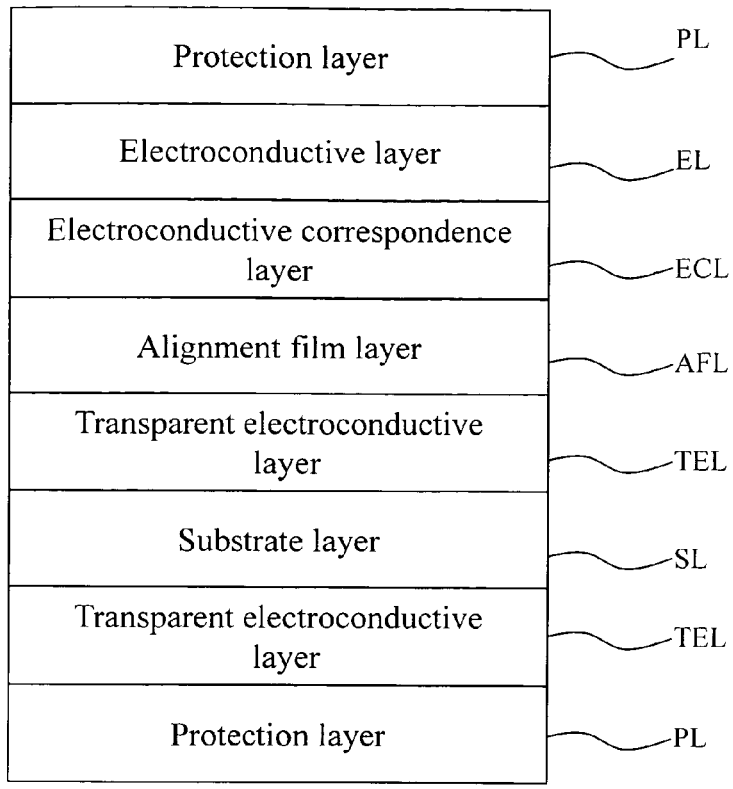
FIGS. 10a to 10d are schematic illustrations showing vertical cross-sections of the structure of the bridging electrode capable of shielding the bright spot.
Figure 10B:
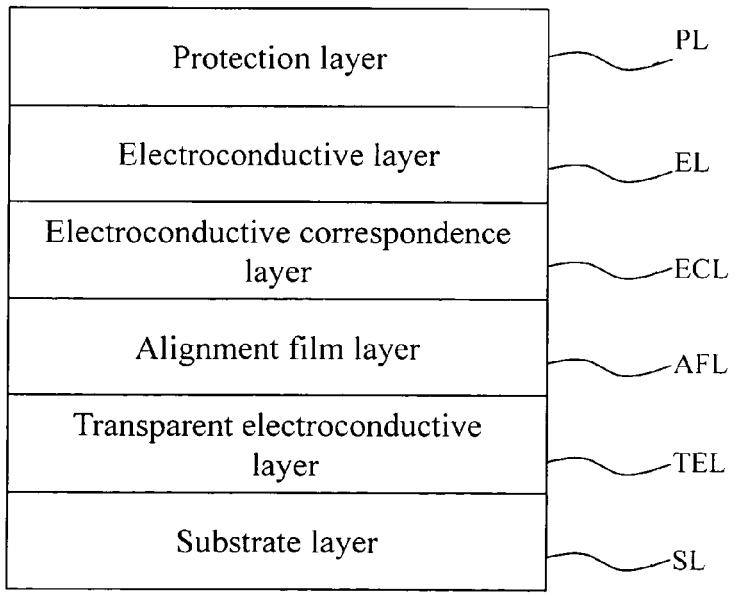
Figure 10C:
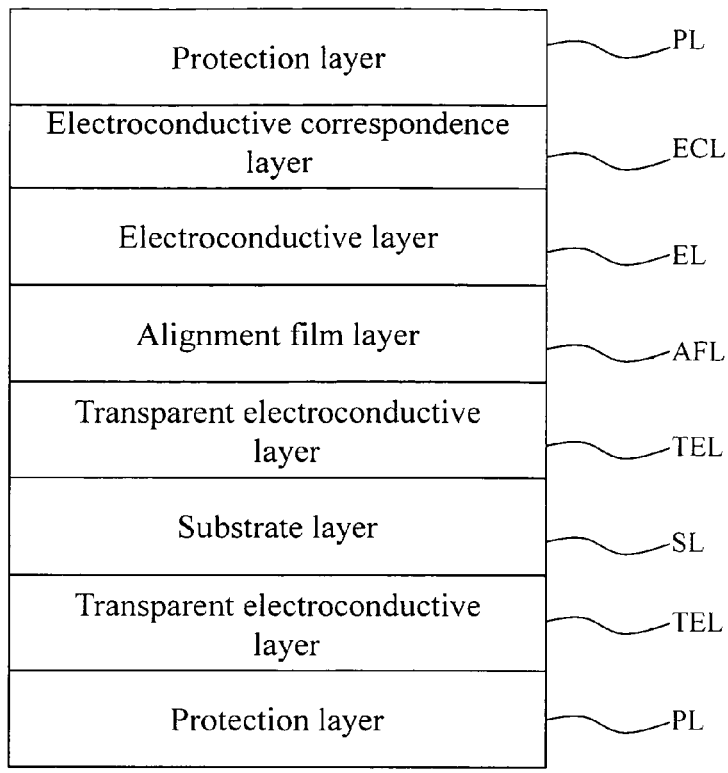
Figure 10D:
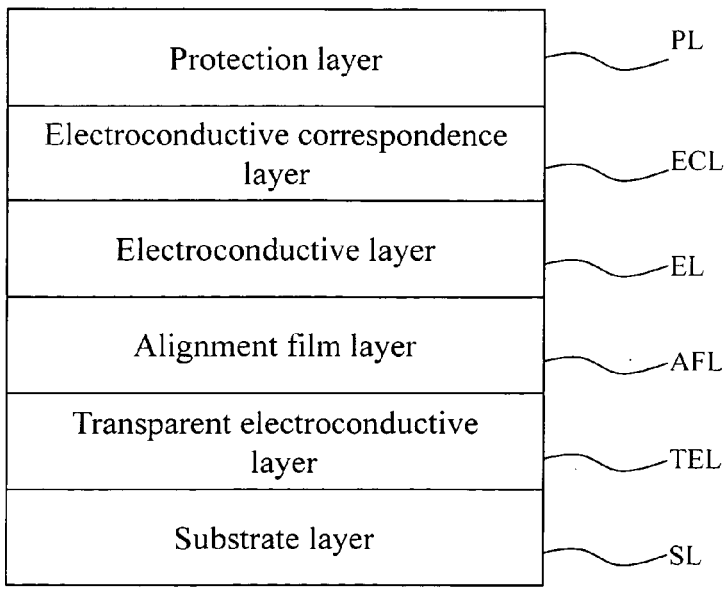

FIGS. 10a to 10d are schematic illustrations showing vertical cross-sections of the structure of the bridging electrode capable of shielding the bright spot. In this embodiment, the structure of the bridging electrode for shielding the bright spot is used in a capacitive touch panel, and includes a substrate layer SL, a transparent electroconductive layer TEL, an alignment film layer AFL, an electroconductive layer EL, an electroconductive correspondence layer ECL and a protection layer PL. The transparent electroconductive layer TEL is disposed on at least one side of the substrate layer SL. The alignment film layer AFL is disposed on one side of the substrate layer SL. The electroconductive layer EL is adjacently disposed on one side of the alignment film layer AFL, and may have a molybdenum-aluminum-molybdenum (MO-AL-MO) structure. The electroconductive correspondence layer SL disposed on one side of the electroconductive layer EL shields the electroconductive layer EL. That is, the electroconductive correspondence layer ECL may be disposed between the electroconductive layer EL and the protection layer PL. In one embodiment, as shown in FIG. 10a, the electroconductive correspondence layer ECL is disposed between the electroconductive layer EL and the alignment film layer AFL. It is to be noted that the length of the electroconductive layer EL is longer than the length of the electroconductive correspondence layer ECL in order to connect the electroconductive layer EL to the transparent electroconductive layer TEL. In another embodiment, as shown in FIG. 10c, the electroconductive correspondence layer ECL is disposed on one side of the electroconductive layer EL. In addition, FIGS. 10b and 10d respectively correspond to the structures of the bridging electrodes of FIGS. 10a and 10c, which are capable of shielding the bright spots, after the manufacturing processes are simplified. So, the invention covers the structures of the bridging electrodes, which are capable of shielding the bright spots and are formed by the standard manufacturing processes, the simplified manufacturing processes and the improved manufacturing processes.

In addition, the above-mentioned structure of the bridging electrode has the protection layer PL disposed on at least one side. In one embodiment, the electroconductive correspondence layer ECL may be disposed between the electroconductive layer EL and the protection layer PL. For example, the protection layer PL may be an organic material layer, a photoresist layer, an anti-reflection (AR) layer, an anti-glare (AG) layer or a combination thereof. Those skilled in the art should understand that the protection layer PL may also be omitted, and the manufacturing order of the layers may also be modified according to the requirements.

Compared with the prior art, the layout method for the bridging electrode capable of shielding the bright spot and the structure of the bridging electrode can effectively enhance the process yield, and can further prevent the bright spot from being formed on the capacitive touch panel according to the electroconductive correspondence layer shielding the electroconductive layer. In one embodiment, the object of shielding the bright spot in the capacitive touch panel may also be achieved without stripping the photoresist of the electroconductive layer.

New characteristics and advantages of the invention covered by this document have been set forth in the foregoing description. It is to be expressly understood, however, that the drawings are for the purpose of illustration only and are not intended as a definition of the limits of the invention. Changes in methods, shapes, structures or devices may be made in details without exceeding the scope of the invention by those who are skilled in the art. The scope of the invention is, of course, defined in the language in which the appended claims are expressed.

What is claimed is:

1. A layout method for a bridging electrode capable of shielding a bright spot, the method comprising the steps of:
   providing a substrate;
   forming a transparent electroconductive layer over the substrate, wherein the transparent electroconductive layer has a plurality of neighboring pattern blocks;
   forming an alignment film layer over the substrate, wherein the alignment film layer has a plurality of bridging grooves crossing between the pattern blocks;
   forming an electroconductive layer over the substrate, wherein the electroconductive layer has a plurality of wires respectively correspondingly disposed over the bridging grooves;
   forming an electroconductive correspondence layer on one side of the electroconductive layer to shield the wires; and
   forming a protection layer over the substrate to enhance a ratio of optical transmission and protect the substrate, the transparent electroconductive layer, the alignment film layer and the electroconductive layer.

2. The layout method according to claim 1, wherein the wires of the electroconductive layer are formed through an optically compensated mask in conjunction with at least one of over exposure and over development.

3. The layout method according to claim 2, wherein the step of forming the alignment film layer further comprises:
   applying a first photoresist over the substrate;
   providing a mask, having a pattern, or a mask, having a half tone pattern, and exposing the pattern or the half tone pattern onto the first photoresist through the mask;
   developing the pattern or the half tone pattern onto the first photoresist to form the bridging grooves crossing between the pattern blocks; and
   baking the first photoresist.

4. The layout method according to claim 3, wherein the step of forming the electroconductive layer further comprises:
   sputtering an electroconductive material over the substrate;
   applying a second photoresist over the substrate;
   providing the optically compensated mask, and over exposing a wire pattern corresponding to the wires onto the second photoresist through the optically compensated mask; and
   developing the wire pattern to form the neighboring pattern blocks, wherein the wire pattern is formed by way of over exposure and over development.

5. The layout method according to claim 4, wherein the step of forming the electroconductive correspondence layer further comprises:
   sputtering an electroconductive material over the substrate;
   applying a third photoresist over the substrate;
   providing the optically compensated mask, and over exposing a corresponding wire pattern, corresponding to the wires, onto the third photoresist through the optically compensated mask; and
   developing and stripping the corresponding wire pattern, applying a fourth photoresist and utilizing the mask of the wires to form an electroconductive correspondence layer pattern shielding the wire pattern.

6. The layout method according to claim 5, wherein the step of forming the protection layer comprises:
   applying/sputtering a fifth photoresist or an organic material over the substrate; and
   baking the fifth photoresist or the organic material to forming a hard protection film.

7. The layout method according to claim 4, wherein the step of forming the electroconductive correspondence layer further comprises:
   sputtering an electroconductive material over the substrate;
   applying a colored photoresist over the substrate;
   providing the optically compensated mask, and over exposing a corresponding wire pattern, corresponding to the wires, onto the colored photoresist through the optically compensated mask; and developing and not stripping the corresponding wire pattern on the colored photoresist to form an electroconductive correspondence layer pattern shielding the wire pattern.

8. The layout method according to claim 7, wherein the step of forming the protection layer comprises:
applying/sputtering a fifth photoresist or an organic material over the substrate; and
baking the fifth photoresist or the organic material to forming a hard protection film.

9. The layout method according to claim 4, wherein the step of forming the electroconductive correspondence layer further comprises:
applying a colored photoresist onto a wire pattern through screen printing or a mask having the wire pattern to form an electroconductive correspondence layer pattern shielding the wire pattern.

10. The layout method according to claim 9, wherein the step of forming the protection layer comprises:
applying/sputtering a fifth photoresist or an organic material over the substrate; and
baking the fifth photoresist or the organic material to forming a hard protection film.

11. A structure of a bridging electrode capable of shielding a bright spot and being used in a capacitive touch panel, the structure comprising:
a substrate;
a plurality of first electrode blocks disposed on the substrate and electrically connected together in series through a first wire;
a plurality of second electrode blocks disposed on the substrate and on two sides of the first wire;
a bridging insulation unit vertically disposed on the first wire and having a bridging groove, wherein a height of the bridging groove is lower than a height of the bridging insulation unit; and
a plurality of electrode correspondence blocks for shielding the first electrode blocks and/or the second electrode blocks;
wherein the second electrode blocks are electrically connected together in series through the bridging insulation unit having a second wire.

12. The structure according to claim 11, wherein the electrode correspondence blocks are made of a colored photoresist.

13. A structure of a bridging electrode capable of shielding a bright spot and being used in a capacitive touch panel, the structure comprising:
a substrate layer;
a transparent electroconductive layer disposed on at least one side of the substrate layer;
an alignment film layer disposed on one side of the substrate layer;
an electroconductive layer adjacently disposed on one side of the alignment film layer;
an electroconductive correspondence layer, disposed on one side of the electroconductive layer, for shielding the electroconductive layer; and
a protection layer disposed on one side of the electroconductive correspondence layer.

14. The structure according to claim 13, wherein the electroconductive correspondence layer is disposed between the electroconductive layer and the protection layer.

15. The structure according to claim 13, wherein the electroconductive correspondence layer is disposed between the electroconductive layer and the transparent electroconductive layer.

16. The structure according to claim 15, wherein a length of the electroconductive layer is longer than a length of the electroconductive correspondence layer.

* * * * *